Dec. 13, 1966 R. H. MOYER 3,290,758

HYBRID SOLID STATE DEVICE

Filed Aug. 7, 1963

INVENTOR
Richard H. Moyer

BY Paris, Haskell & Levine
ATTORNEY

United States Patent Office 3,290,758

Patented Dec. 13, 1966

3,290,758

HYBRID SOLID STATE DEVICE

Richard H. Moyer, Southampton, Pa., assignor, by mesne assignments, to United Aircraft Corporation, a corporation of Delaware Filed Aug. 7, 1963, Ser. No. 300,548
11 Claims. (Cl. 29—155.5)

This invention generally relates to micro inductors and transformers having magnetic cores, and to processes of manufacturing these components, and more particularly to such articles and processes involving in their manufacture a combination of semi-conductor integration technology and thin film deposition technology.

Very generally according to the present invention, there is provided a micro inductor structure and process wherein a series of conductors are provided as an integrated part of a semi-conducting body by the application of integrated circuit technology. The semi-conductor body is then coated with magnetic material overlying the integrated conductors and then is plated with a series of conductors overlying the magnetic layer, with the plated conductors being in proper alignment with the integrated conductors such that the combination of the plated conductors and the integrated conductors provide a continuous electrical path about the magnetic core. The present state of the art in semi-conductor integration technology and in thin film coating technology permits a highly precise formation of the inductor coil and deposited magnetic layer to provide micro sized inductors having precisely controllable electrical and magnetic characteristics. These micro inductors may be provided in any one of a number of different shapes and sizes, as well as with a greater or lesser number of coils. Thus according to the present invention, there can be provided in-line inductors, toroidal inductors, or any combination thereof as well as micro transformers of various configurations.

It is accordingly a principal object of the present invention to provide improvements in micro inductors having magnetic cores, and improvements in the manufacturing processes for such articles.

A further object is to provide such articles having precisely controllable dimensions and the electrical characteristics.

Still another object is to provide such micro inductors that may be formed in any desired configuration by following the preferred process of manufacture of the present invention.

A still further object of the present inevntion is to provide improved processes for manufacturing micro inductors and transformers that may be readily reproduced with identical characteristics.

Figure 1:
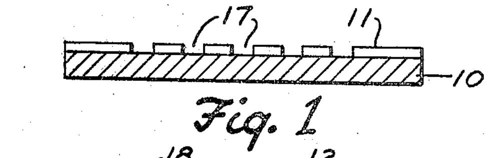
Figure 2:
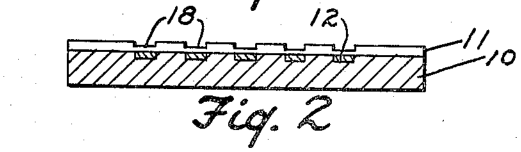
Figure 3:
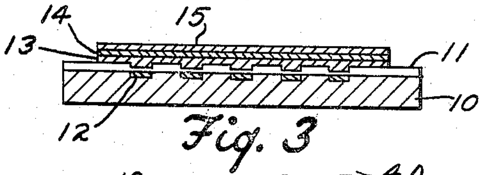
Figure 1A:
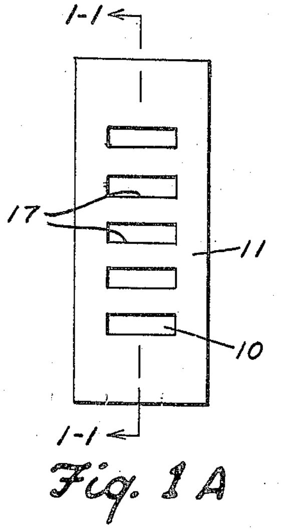
Figure 4:
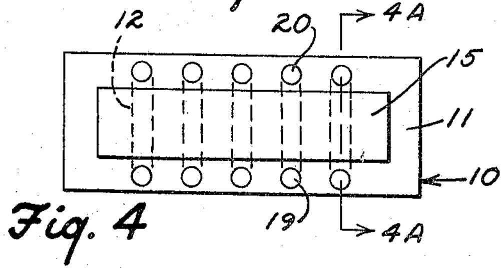
Figure 3A:
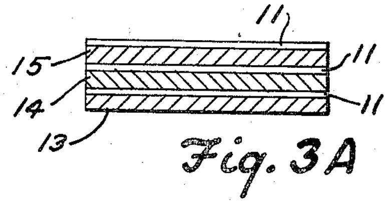
Figure 5:
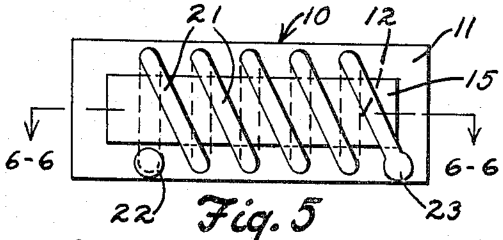
Figure 4A:
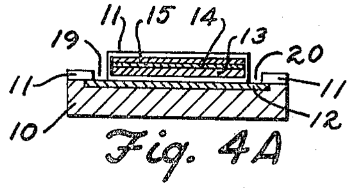
Figure 6:
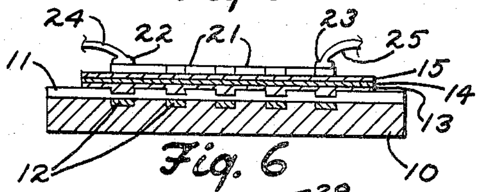
Figure 7:
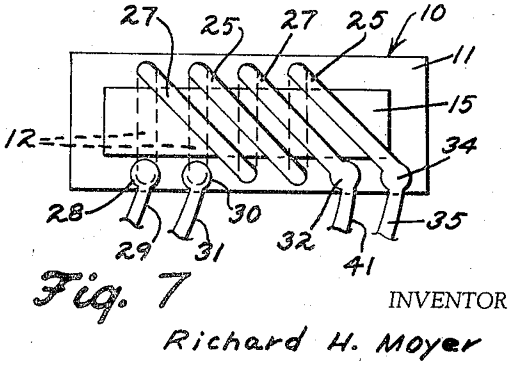
Figure 8:
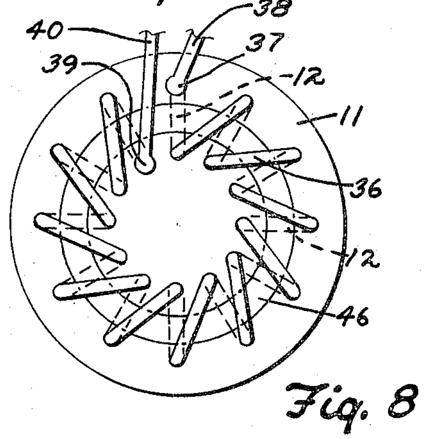

Other objects and many additional advantages will be more readily understood by those skilled in the art after a detailed consideration of the following specification taken with the accompanying drawing wherein:

FIG. 1A is a plan view of a wafer of semi-conducting material having a masking layer on its upper surface, FIGS. 1, 2 and 3 are cross-sectional views taken along lines 1—1 of FIG. 1A and illustrating successive stages of manufacture of the micro inductance, FIG. 3A is an enlarged sectional view showing the insulation between the layers of deposited magnetic material, FIG. 4 is a plan view, similar to FIG. 1A, and illustrating the inductance at one of the final stages of its manufacture, FIG. 4A is a cross-sectional view taken through lines 4A—4A of FIG. 4, FIG. 5 is a plan view, similar to FIGS. 1A and 4, and illustrating the completed micro inductance, FIG. 6 is a cross-sectional view taken through lines 6—6 of FIG. 5, FIG. 7 is a plan view, similar to FIG. 5, and illustrating a micro transformer, manufactured according to the invention, and FIG. 8 is a plan view illustrating a toroidally shaped micro inductance manufactured according to the process of the present invention.

Referring now to the drawings for a detailed consideration of a preferred process for manufacturing a micro inductance according to the present invention, there is shown in FIGS. 1 to 6, a micro inductance at various stages of its manufacture. As shown in FIG. 1, a wafer 10 is initially provided of a semi-conducting material such as silicon having, for example, an N-type impurity therein. This wafer 10 has formed thereon as an initial step of the invention, a coating 11 entirely covering the upper surface of the wafer. Preferably, this coating is formed of a silicon dioxide, and various methods of producing such a layer are known in the art, as, for example, by heating and exposing the silicon wafer to an atmosphere of steam, air, or oxygen and air, or by utilizing an oxidizing agent such as $HNO_3$ or the like. This oxide coating or layer 11 is formed into a mask having a plurality of parallel arranged rectangular openings 17 therein, which may be accomplished with photolithographic techniques followed by etching, as for example, etching of the oxide layer with hydrofluoric acid, using the photolithic layer as a mask. After completion of this step, there is provided, as shown in FIG. 1 and FIG. 1A, a silicon wafer 10 that is selectively covered by a protective coating of oxide 11 and having a series of openings 17 to expose the surface of the silicon in the desired pattern of a series of parallel arranged rectangular openings or stripes 17.

In the next step of manufacture, impurities of the opposite type than the wafer are diffused at a high temperature into the wafer 10 through the openings 17 of the mask 11 so as to produce a series of spaced parallel conducting regions or portions 12 within the wafer as shown in FIG. 2. These portions 12 are highly conductive stripes disposed in a parallel arrangement within the silicon wafer, as shown.

The diffusion of the impurities into the wafer of silicon 10, is performed in an oxidizing atmosphere, so that as indicated in FIG. 2, an oxide layer 18 is formed over the stripes to cover the surface of the silicon wafer.

In the next step, as is generally illustrated in FIG. 3, a series of thin layers of magnetic material 13, 14, and 15 are successively evaporated over a preselected portion of the silicon wafer to overlie the highly conductive stripes 12 that have been previously diffused into the wafer. The location of the evaporated layers of magnetic material with respect to the diffused stripes 14 is shown in FIG. 4, and as noted, completely overlies the central portions of the diffused stripes 12, but leaving the end portions of the stripes accessible from the surface of the wafer. For depositing the magnetic layers 13, 14, 15, in the rectangular configuration shown a metal mask (not shown- may be applied over the surface of the wafer, and the magnetic material may be evaporated as layers of thin film through the rectangular opening provided in this mask. Alternatively phosphorous techniques may be employed to define the selected rectangular area where it is desired to deposit the magnetic material, in the same manner as was employed in the earlier steps of the process to define the cut-out regions 17 of oxide mask as in FIG. 1A. The magnetic material employed may be of conventional magnetic compounds comprised of iron, nickel, and the like, that are well known in the art of magnetic core inductances, and further details are accordingly not believed necessary.

As illustrated in FIG. 3A, there is preferably provided an insulation layer 11 between each of the deposited layers of magnetic material, 13, 14, and 15, respectively, and these insulation layers 11 may be thin layers of oxide 11. This is easily performed after evaporating each layer of magnetic material by back filling the evaporator with oxygen and maintaining the silicon wafer heated at an elevated temperature, or by evaporating a thin coating silicon monoxide onto the surface of each magnetic layer.

Each of the layers of magnetic material and oxide coating is deposited in sequence, with the layer 13 being first evaporated and deposited, and then a layer of oxide being formed thereover. Next the magnetic layer 14 and a layer of oxide 11, and finally the third magnetic layer 15, with a final layer of oxide thereover. This final layer of oxide or silicon oxide completely covers the magnetic material as well as the remainder of the silicon wafer, whereby the magnetic layers are completely insulated from one another and from the wafer.

In the following step as is generally illustrated in FIG. 4, an upper series of holes or openings 20 are provided in a linear array adjacent and along the upper edge of the wafer, with each of the openings 20 passing through the oxide or silicon oxide coating 11 and being in alignment to expose the end of a different one of the diffused stripes 12, thereby to provide access to one end of each of the diffused stripes 12. Similarly, there is provided a lower series of openings or holes 19 through the oxide coating 11 adjacent the lower edge of the wafer and each in alignment with the diffused stripes 12 to expose and provide access to the lower terminals of the stripes 12. These upper and lower openings 20 and 19 may be formed by employing a photoresist mask over the wafer having openings therein in the proper alignment with the stripes 12, and then etching the oxide coating uncovered by the mask to selectively provide the two series of openings 19 and 20 through the oxide coating as described.

In the final steps of the process, as illustrated in FIGS. 5 and 6, a photoresist or other mask (not shown) is again applied to the wafer covering all areas of its upper surface except paths leading between the diagonally opposite ends of the conductor stripes 12. After this mask is applied, a series of metal interconnecting conductors 21 are evaporated onto the wafe to electrically interconnect the diagonally opposite ends of adjoining ones of the stripes 12 thereby to electrically interconnect the stripes and provide a continuous electrical path through the stripes 12 and through the deposited conductors 21, leading from one end of the wafer to the other. In evaporating the metal film conductors 21, metal is also deposited into the upper and lower series of openings 19 and 20 such that the metal conductors 21 electrically interconnect each of the diffused stripes 12 to the next in the described manner to provide a continuous conductor leading from one end of the wafer to the other. It will be noted that the conducting paths provided by the diffused stripes 12 and the deposited film conductors 21 encircle the deposited magnetic layers 13, 14, and 15 to effectively provide an inductance coil that encircles the magnetic layers along their length. At each of the opposite ends of this inductance, larger metal lands 22 and 23 are deposited for attachment to external electrical conducting leads 24 and 25, as best shown in FIG. 6, thereby to enable the external electrical conductors 24 and 25 to be easily attached to the micro inductance.

Thus, as shown in the cross-sectional view of FIG. 6, the micro inductance comprises a silicon wafer 10 having a series of diffused conducting stripes 12 therein, a series of thin magnetic layers 13, 14, and 15, disposed above the diffused stripes, and a series of deposited thin conductors 21 being disposed above the magnetic material layers and interconnecting the diffused stripes 12 to provide a sinuous conducting path completely surrounding the magnetic material layers along their length, thereby to provide a magnetic core inductance. It will be noted from FIG. 6, that the conductors surrounding the magnetic layers are completely insulated from the layers by means of a thin oxide coating, and the deposited metal magnetic layers 13, 14, and 15 are also electrically insulated from one another by thin oxide layers 11 as best shown in FIG. 3A.

As is now believed evident to those skilled in the art, various configurations of this micro inductance construction may be provided by following the above teachings. For example, in FIG. 8, there is shown a toroidally shaped inductance which may be manufactured using these same process steps. In this construction, the silicon wafer may be initially provided as a circular dice, with the diffused strips 12 being provided therein in the form of spaced radially arranged conductors that are symmetrically diffused in the circular pattern shown. The thin film magnetic layers, are deposited in the configuration of rings 46 or toroids, with a series of such toroidally shaped magnetic layers being provided one on top of the other in the same manner as shown in FIG. 3A. Thereafter, in the final steps, the end terminals of each of the diffused stripes 12 are made accessible by providing openings through the oxide layer to expose the ends of these stripes, and metallic conductors 36 are then deposited in the desired arrangement to interconnect the diagonally opposite end of each stripe to that of the next, thereby to provide a continuous conductor coil circumambiently about the magnetic core. At the end of this integrated and deposited coil structure, metal lands 37 and 39 are provided, and electrical conducting leads 38 and 40 are suitably attached to these metal lands to provide electrical connection to the micro toroid.

FIG. 7 illustrates a bifilar micro transformer structure that may be provided according to the same process as described above. In this embodiment, a first series of metal conductors 27 are deposited in such fashion as to interconnect the opposite ends of every other alternate one of the diffused stripes to form a first coil and a second series of deposited conductors 25 interconnect the remaining stripes to provide a second coil having turns between each turn of the first coil thereby to provide two side-by-side inductance paths or coils, as shown, rather than one continuous conducting inductance coil as in the embodiment of FIG. 5. A first pair of metal lands 28 and 32 are deposited at the end terminals of one of the inductances for interconnection with electrical conducting leads 29 and 41, and a second pair of enlarged metal lands 30 and 34 are provided at the opposite terminals of the second inductance for interconnection with electrical conducting leads 31 and 35. In a manner similar to that described, the two coils of the micro transformer may also be provided in side-by-side arrangement (not shown) rather than in bifilar configuration, either on a toroidally shaped magnetic core, as shown in FIG. 8, or about an otherwise shaped magnetic core as might be desired.

Although but one preferred embodiment of the invention has been illustrated and described, it is believed evident that many changes may be made by those skilled in the art without departing from the spirit and scope of this invention. For example, the micro inductance or micro transformer according to the present invention may be further integrated and combined with other elements in the nature of transistors, diodes, or capacitors, which other elements may also be integrally formed within the silicon wafer 10, and thereby integrated with the micro transformer or inductance structure. For example, a voltage tunable capacitor may be diffused into the silicon wafer 10 (not shown) and combined with the micro inductance to provide a tuned circuit. Such diffused type capacitances, as is well known in the art, are voltage variable, and consequently such integrated micro inductance-capacitor unit would be responsive to the amplitude of an applied voltage to vary the reactance of the circuit.

Since these and many other changes may be made by those skilled in the art, this invention is to be considered as being limited only according to the following claims appended hereto.

What is claimed is:

1. A process for constructing a micro magnetic core inductor winding comprising:
diffusing a series of spaced conductors into a semi-conducting substrate,
forming a thin layer of magnetic material on such substrate and over said diffused conductors in electrically insulated relationship to said diffused conductors,
and forming a series of thin conductors over said magnetic layer in electrically insulated relationship to said magnetic layer and electrically interconnecting said diffused conductors and said thin conductors, said thin conductors being applied in such alignment with said diffused conductors as to form with them at least one continuous electrical path encircling the magnetic layer.

2. A process for constructing a micro magnetic core inductor winding comprising:
diffusing a series of spaced conductors into a semi-conducting substrate,
evaporating a thin layer of magnetic material on said substrate and over said diffused conductors in electrically insulated relationship to said diffused conductors,
and evaporating a series of thin conductors over said magnetic layer in electrically insulated relationship to said magnetic layer and electrically interconnecting said diffused conductors and said thin conductors, said thin conductors being applied in such alignment with said diffused conductors as to form with them at least one continuous electrical path encircling the magnetic layer.

3. A process for constructing a micro magnetic core inductor winding comprising:
providing a first predetermined mask over a substrate of semi-conducting material,
diffusing an opposite type impurity into said substrate by the use of said mask to provide a series of spaced electrical conductors within the semi-conductor substrate,
providing a second mask on the substrate,
forming a thin layer of magnetic material by the use of said second mask in a pattern overlying the spaced conductors with the layer of magnetic material being insulated from the diffused conductors,
providing a third mask over said substrate and over said thin layer of magnetic material,
forming a series of thin spaced conductors by the use of the third mask over the magnetic layer and electrically interconnecting said diffused conductors and said thin conductors, said thin conductors being applied in such alignment with said diffused conductors as to form with them at least one continuous electrical path encircling the magnetic layer.

4. In the process of claim 3, the step of forming a thin layer of magnetic material on said substrate being performed by evaporating and condensing a magnetic material vapor on the substrate, and the step of forming the series of thin spaced conductors over the magnetic layer being performed by evaporating and condensing a vapor of conducting material.

5. A process for constructing a micro transformer having a magnetic core comprising:
diffusing a series of spaced conductors into a semi-conducting substrate,
forming a thin layer of magnetic material on said substrate and over said diffused conductors,
and forming two series of spaced thin conductors over said magnetic layer and electrically interconnecting said thin conductors with preselected ones of said diffused conductors within said substrate, said thin conductors being applied in such alignment with said diffused conductors as to form therewith a pair of continuous electrical paths encircling the magnetic layer and being inductively coupled with one another.

6. In the process of claim 5, the step of forming the thin layer of magnetic material being performed by evaporating and condensing a vapor of magnetic material on the substrate, and the step of forming the series of thin conductors being performed by evaporating and condensing an electrically conductive material in the desired pattern on the substrate and above the layer of magnetic material.

7. In the process of claim 5, the step of diffusing the series of spaced conductors into the semi-conducting substrate being performed by masking the substrate in a predetermined desired pattern, and diffusing an opposite type impurity into the substrate in the pattern defined by said mask to provide the series of spaced conductors, and the steps of forming the thin layer of magnetic material and forming the series of thin conductors over said layer of magnetic material being performed in succession and including the steps of sequentially masking the substrate in the pattern desired for each step and evaporating a magnetic material vapor onto the substrate to form the magnetic layer and evaporating a vapor of electrically conductive material onto the substrate and over the magnetic layer to form the series of thin conductors.

8. In the process of claim 1, said series of spaced conductors being diffused into the semi-conducting substrate in a radially arranged pattern, and said thin layer of magnetic material being formed over said conductors in the pattern of a toroid, and said series of thin conductors over said magnetic material being formed in a pattern to interconnect the diffused conductors in series, thereby to provide a toroidal inductor having a magnetic core.

9. In the process of claim 5, said series of thin conductors being formed over said magnetic layer being spaced in such manner as to interconnect every other alternate one of said series of said spaced diffused conductors thereby to provide a bifilar transformer.

10. A process for constructing a micro magnetic core inductor comprising:
diffusing a series of spaced conductors into a semi-conducting substrate and providing a thin layer of insulating material over said diffused conductors,
forming a thin layer of magnetic material over said insulating layer in a predetermined pattern leaving the ends of said series of diffused conductors accessible,
providing a series of openings through said insulating layer and in alignment with the ends of said diffused conductors to provide accessibility to the diffused conductors from the outer surface of said substrate,
and forming a series of outer thin conductors over said magnetic layer and electrically interconnecting said diffused conductors and said thin conductors, said thin conductors being applied in such alignment with said diffused conductors as to form therewith a series of continuous electrical paths encircling the magnetic layer.

11. A process for constructing a micro magnetic core inductor comprising:
diffusing a series of spaced conductors into a semi-conducting substrate,
forming a thin layer of magnetic material on said substrate and over said diffused conductors,
forming a thin coating of insulating material over said magnetic material,
forming a second thin layer of magnetic material over said layer of insulating material,
forming a second thin layer of insulating material over said second layer of magnetic material,
and forming a series of thin conductors over said magnetic layers in electrically insulated relationship to said magnetic layers and electrically interconnecting said diffused conductors and said thin conductors, said thin conductors being applied in such alignment with said diffused conductors as to form with them at least one continuous electrical path encircling the magnetic layers.

References Cited by the Examiner

UNITED STATES PATENTS

| | | | |
|---|---|---|---|
| 2,586,320 | 2/1952 | Ford | 29—155.58 |
| 2,995,473 | 8/1961 | Levi. | |
| 3,011,247 | 12/1961 | Hamlet | 29—155.5 |
| 3,080,541 | 3/1963 | Parker | 336—200 |
| 3,089,106 | 3/1963 | Saaty | 336—200 |
| 3,138,743 | 6/1964 | Kilby. | |
| 3,169,892 | 2/1965 | Lemelson | 29—155.7 X |
| 3,199,002 | 8/1965 | Martin | 29—155.5 X |

JOHN F. CAMPBELL, *Primary Examiner.*

JOHN F. BURNS, WHITMORE A. WILTZ, CHARLIE T. MOON, *Examiners.*

T. J. KOZMA, W. I. BROOKS, *Assistant Examiners.*